US010731761B2

(12) United States Patent
Chuong et al.

(10) Patent No.: US 10,731,761 B2
(45) Date of Patent: Aug. 4, 2020

(54) HYDROSTATIC NON-CONTACT SEAL WITH OFFSET OUTER RING

(71) Applicant: United Technologies Corporation, Farmington, CT (US)

(72) Inventors: Conway Chuong, Manchester, CT (US); Tara L. D'Ambruoso, Oxford, CT (US); Joey Wong, Enfield, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 311 days.

(21) Appl. No.: 15/650,457

(22) Filed: Jul. 14, 2017

(65) Prior Publication Data

US 2019/0017606 A1   Jan. 17, 2019

(51) Int. Cl.

| F16J 15/44 | (2006.01) |
| F01D 25/22 | (2006.01) |
| F03D 9/34  | (2016.01) |
| F01D 5/03  | (2006.01) |
| F01D 11/02 | (2006.01) |
| F01D 11/12 | (2006.01) |
| F03B 3/12  | (2006.01) |
| F03B 3/16  | (2006.01) |

(52) U.S. Cl.
CPC .............. *F16J 15/442* (2013.01); *F01D 5/03* (2013.01); *F01D 11/025* (2013.01); *F01D 11/12* (2013.01); *F01D 25/22* (2013.01); *F03D 9/34* (2016.05); *F03B 3/12* (2013.01); *F03B 3/16* (2013.01); *F05D 2240/53* (2013.01)

(58) Field of Classification Search
CPC ................................. F16J 15/44–453
See application file for complete search history.

(56) References Cited

U.S. PATENT DOCUMENTS

| 4,426,087 A | 1/1984 | Sargent |
| 4,998,739 A * | 3/1991 | Weiler .................. F01D 11/025 |
| | | 277/422 |
| 5,333,993 A | 8/1994 | Stueber |
| 6,226,975 B1 | 5/2001 | Ingistov |
| 7,726,660 B2 | 6/2010 | Datta |

(Continued)

FOREIGN PATENT DOCUMENTS

| CA | 2536362 C | 2/2013 |
| EP | 2807345 B1 | 3/2018 |

(Continued)

OTHER PUBLICATIONS

Extended European Search Report for EP Patent Appln, No. 18172186.1 dated Oct. 2, 2018.

*Primary Examiner* — Vishal A Patel
(74) *Attorney, Agent, or Firm* — Getz Balich LLC

(57) ABSTRACT

A non-contact seal assembly includes a plurality of seal shoes arranged about a centerline in an annular array, the seal shoes including a first seal shoe extending axially along the centerline between a first shoe end and a second shoe end. The non-contact seal assembly may comprise a seal base circumscribing axially offset from the annular array of the seal shoes. The non-contact seal assembly may further comprise a plurality of spring elements, each of the spring elements radially distal from and connecting to a respective one of the seal shoes, and each of the plurality of spring elements is axially adjacent to the seal base.

14 Claims, 4 Drawing Sheets

(56) References Cited

U.S. PATENT DOCUMENTS

| | | |
|---|---|---|
| 8,002,285 B2 | 8/2011 | Justak |
| 8,172,232 B2 | 5/2012 | Justak |
| 8,919,781 B2 | 12/2014 | Justak |
| 9,097,350 B2 | 8/2015 | Dale |
| 9,145,785 B2 | 9/2015 | Bidkar |
| 9,359,908 B2 | 6/2016 | Bidkar |
| 9,995,163 B2 | 6/2018 | Chuong |
| 10,030,531 B2 | 7/2018 | Peters |
| 10,060,280 B2 | 8/2018 | Crawley, Jr. |
| 10,082,039 B2 | 9/2018 | Hanson |
| 10,094,232 B2 | 10/2018 | McCaffrey |
| 10,100,657 B2 | 10/2018 | Chuong |
| 10,119,474 B2 | 11/2018 | Hyland |
| 2004/0150164 A1 | 8/2004 | Morgan |
| 2008/0265513 A1* | 10/2008 | Justak .................. F01D 11/025 277/301 |
| 2013/0259660 A1 | 10/2013 | Dale |
| 2014/0008871 A1* | 1/2014 | Bidkar .................. F16J 15/447 277/303 |
| 2014/0050564 A1 | 2/2014 | Hagan |
| 2014/0062024 A1* | 3/2014 | Bidkar .................. F01D 11/025 277/303 |
| 2014/0119912 A1 | 5/2014 | Bidkar |
| 2016/0010480 A1* | 1/2016 | Bidkar .................. F01D 11/02 277/303 |
| 2016/0069269 A1* | 3/2016 | Hyland .................. F01D 19/00 415/1 |
| 2016/0097294 A1* | 4/2016 | Wilson .................. F01D 11/001 415/173.1 |
| 2016/0102570 A1 | 4/2016 | Wilson |
| 2016/0108750 A1 | 4/2016 | Wilson et al. |
| 2016/0109025 A1* | 4/2016 | McCaffrey ............ F01D 11/025 277/411 |
| 2016/0115804 A1* | 4/2016 | Wilson .................. F01D 11/00 277/503 |
| 2016/0115805 A1* | 4/2016 | Gibson .................. F01D 11/025 415/173.5 |
| 2016/0115825 A1 | 4/2016 | Wilson |
| 2016/0130963 A1* | 5/2016 | Wilson .................. F01D 11/001 60/805 |
| 2017/0044918 A1 | 2/2017 | McCaffrey |
| 2017/0051631 A1 | 2/2017 | Ackerman et al. |
| 2017/0130732 A1 | 5/2017 | Schwarz |
| 2017/0211402 A1 | 7/2017 | Peters |
| 2017/0226883 A1 | 8/2017 | Peters |
| 2017/0306780 A1 | 10/2017 | Peters |
| 2018/0045066 A1 | 2/2018 | Chuong |
| 2018/0045067 A1 | 2/2018 | Chuong |
| 2018/0058237 A1 | 3/2018 | Wilson |
| 2018/0058238 A1 | 3/2018 | Wong |
| 2018/0058239 A1 | 3/2018 | Paulino |
| 2018/0119559 A1 | 5/2018 | Hanson |
| 2018/0363562 A1 | 12/2018 | Chuong |
| 2018/0363563 A1 | 12/2018 | Gunderson |
| 2018/0372228 A1 | 12/2018 | D'Ambruoso |
| 2018/0372229 A1* | 12/2018 | Bidkar .................. F16J 15/442 |

FOREIGN PATENT DOCUMENTS

| | | |
|---|---|---|
| GB | 2092242 B | 12/1984 |
| WO | 2008094761 A1 | 8/2008 |
| WO | 2016179608 | 11/2016 |

\* cited by examiner

HYDROSTATIC NON-CONTACT SEAL WITH OFFSET OUTER RING

This invention was made with government support under Contract No. FA8626-16-C-2139 awarded by the United States Air Force. The government may have certain rights in the invention.

BACKGROUND OF THE INVENTION

1. Technical Field

The present disclosure relates generally to hydrostatic non-contact seals. More particularly, the disclosure relates to hydrostatic non-contact seals that use an offset outer ring.

2. Background Information

Rotational equipment typically includes one or more seal assemblies for sealing gaps between rotors and stators. A typical seal assembly includes a contact seal with a seal element such as a knife edge seal that engages a seal land. The hydrostatic non-contact seal includes a full ring portion that connects beams and shoes together, in order to function properly as a full seal ring. The full ring is located outboard of the beams and the shoes. This adds radial weight to the seal assembly. It is typical to be radially challenged for space in a gas turbine engine which may require parts to be thinned or reconfigured to fit and function properly in the design space.

It would be desirable to reduce the radial height and/or the weight of the seal.

SUMMARY OF THE DISCLOSURE

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a non-contact seal assembly, having a plurality of seal shoes arranged about a centerline in an annular array, the seal shoes including a first seal shoe extending axially along the centerline between a first shoe end and a second shoe end. The non-contact seal assembly may comprise a seal base circumscribing axially offset from the annular array of the seal shoes. The non-contact seal assembly may further comprise a plurality of spring elements, each of the spring elements radially distal from and connecting to a respective one of the seal shoes, and each of the plurality of spring elements is axially adjacent to the seal base.

The seal base may be connected to a seal carrier surface that is substantially cylindrical and extends circumferentially around and faces towards the centerline.

The non-contact seal assembly may further comprise a first ring structure configured and arranged to at least one of position, support or mount to a secondary seal device axially separated from the seal base and radially adjacent to the first seal shoe The non-contact seal assembly may further comprise a secondary seal device axially and radially adjacent to the seal base and axially adjacent to first the seal shoe.

The seal assembly may comprise nickel alloy.

The seal assembly may comprise one of cobalt alloy or aluminum.

The first seal shoe may extend circumferentially, at the first shoe end, between a first shoe side and a second shoe side for a seal shoe length.

The seal shoes may collectively form a substantially annular end surface at the second shoe end.

According to another aspect of the present disclosure, a non-contact seal is provided. The non-contact seal assembly may provide a plurality of seal shoes arranged about a centerline in an annular array, the seal shoes including a first seal shoe extending axially along the centerline between a first shoe end and a second shoe end. The non-contact seal assembly may comprise a seal base circumscribing axially offset along the centerline from the annular array of the seal shoes. The non-contact seal assembly may further comprise a plurality of spring elements, each of the spring elements radially between and connecting a respective one of the seal shoes with the seal base. The non-contact seal assembly may further comprise a plurality of spring elements, each of the spring elements radially distal from and connecting to a respective one of the seal shoes, and each of the plurality of spring elements is axially adjacent to the seal base, where a void is formed by a most radially distal one of the plurality of spring elements, the axially offset seal base, a stator structure, and a ring structure that is axially separated from the axially offset seal base by the plurality of spring elements.

The axially offset seal base may be connected to a seal carrier surface that is substantially cylindrical and extends circumferentially around and faces toward the centerline.

The non-contact seal assembly may further comprise a first ring structure configured and arranged to at least one position, support or mount to a secondary seal device axially separated from the axially offset seal base and radially adjacent to the first seal shoe.

The non-contact seal assembly may further comprise a secondary seal device that is axially and radially adjacent to the axially offset seal base and axially adjacent to the first seal shoe.

The seal assembly may comprise nickel alloy.

The seal assembly may comprise one of cobalt alloy or aluminum.

The first seal shoe extends circumferentially, at the first shoe end, between a first shoe side and a second shoe side for a seal shoe length.

According to another aspect of the present disclosure, an assembly for rotational equipment with an axial centerline is provided. The assembly may comprise a stator structure and a rotor structure. The assembly may comprise a seal assembly configured to substantially seal an annular gap between the stator structure and the rotor structure, the seal assembly comprising a hydrostatic non-contact seal device including a plurality of seal shoes, an axially offset seal base and a plurality of spring elements. The seal shoes arranged about a centerline in an annular array, the seal shoes sealingly engaging the rotor structure and including a first seal shoe extending axially along the centerline between a first shoe end and a second shoe end. The axially offset seal base circumscribing the annular array of the seal shoes, the axially offset seal base mounted with the stator structure. The assembly may comprise a plurality of spring elements, each of the spring elements radially distal from and connecting to a respective one of the seal shoes, and each of the plurality of spring elements is axially adjacent to the axially offset seal base, where the axially offset seal base is axially offset with respect to the plurality of spring elements.

The axially offset seal base may be connected to a seal carrier surface that is substantially cylindrical and extends circumferentially around and faces towards the centerline.

The assembly for rotational equipment may further comprise a first ring structure configured and arranged to at least one of position, support or mount to a secondary seal device axially separated from the axially offset seal base and radially adjacent to the first seal shoe.

The assembly for rotational equipment may further comprise a secondary seal device that is axially and radially adjacent to the axially offset seal base and axially adjacent to the first seal shoe.

BRIEF DESCRIPTION OF THE DRAWINGS

The present disclosure is illustrated by way of example and not limited in the accompanying figures in which like reference numerals indicate similar elements. The drawing figures are not necessarily drawn to scale unless specifically indicated otherwise.

DETAILED DESCRIPTION

Figure 1:
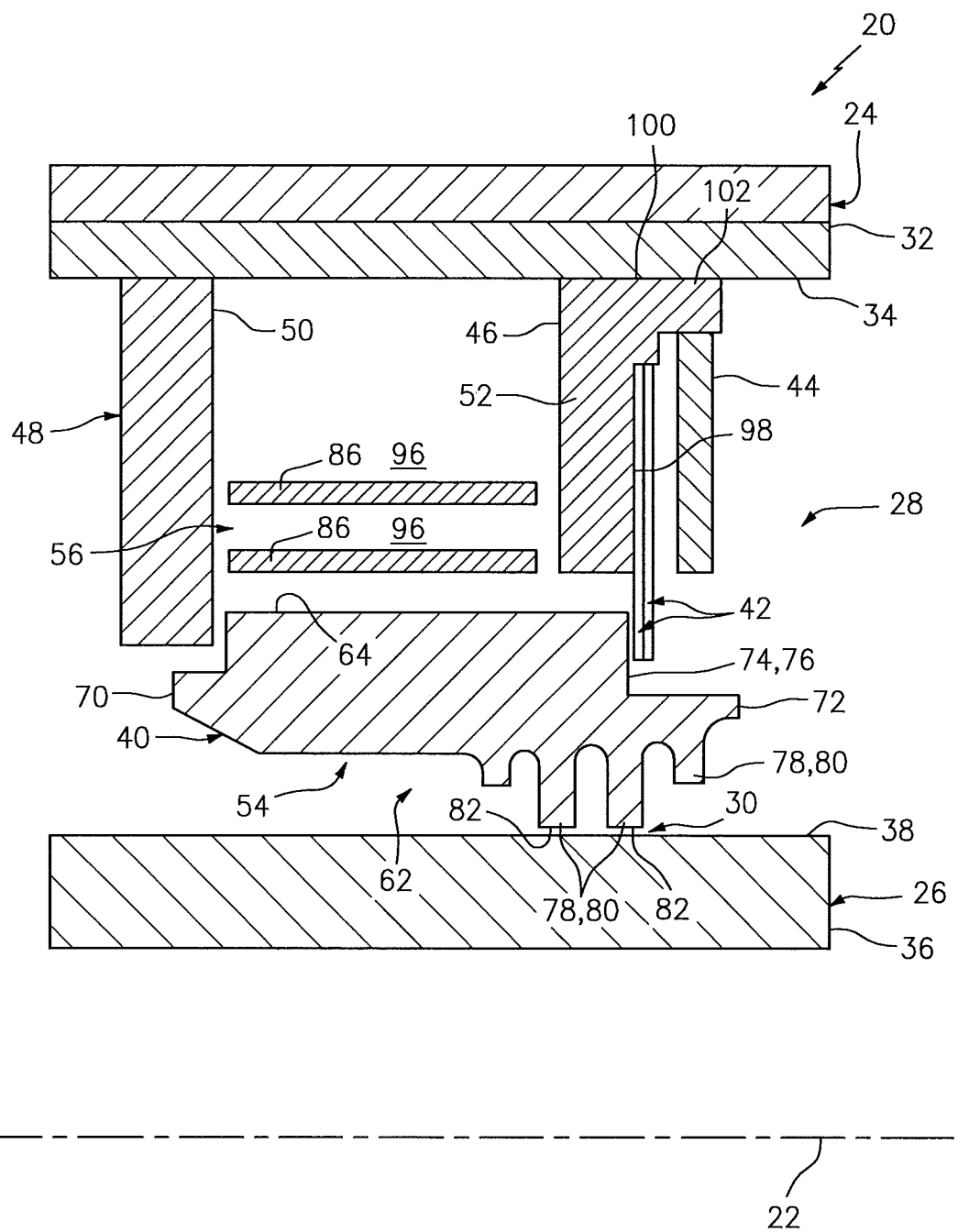
FIG. 1 is a top half side sectional illustration of an assembly for rotational equipment, such as for example a gas turbine engine.

It is noted that various connections are set forth between elements in the following description and in the drawings (the contents of which are incorporated in this specification by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

Aspects of the disclosure may be applied in connection with a gas turbine engine.

FIG. 1 illustrates an assembly 20 for rotational equipment with an axial centerline 22. An example of such rotational equipment is a gas turbine engine for an aircraft propulsion system, an exemplary embodiment of which is described below in further detail. However, the assembly 20 of the present disclosure is not limited to such an aircraft or gas turbine engine application. The assembly 20, for example, may alternatively be configured with rotational equipment such as an industrial gas turbine engine, a wind turbine, a water turbine, or any other apparatus in which a seal is provided between a stator structure and a rotor structure.

The assembly 20 of FIG. 1 includes a stator structure 24, a rotor structure 26 and a seal assembly 28. This seal assembly 28 is mounted with the stator structure 24, and configured to substantially seal an annular gap 30 between the stator structure 24 and the rotor structure 26 as described below in further detail.

The stator structure 24 includes a seal carrier 32. This seal carrier 32 may be a discrete, unitary annular body. Alternatively, the seal carrier 32 may be configured with another component/portion of the stator structure 24. The seal carrier 32 has an inner radial seal carrier surface 34. This seal carrier surface 34 may be substantially cylindrical, and extends circumferentially around and faces towards the axial centerline 22. The seal carrier surface 34 at least partially forms a bore in the stator structure 24. This bore is sized to receive the seal assembly 28, which may be fixedly attached to the seal carrier 32 by, for example, a press fit connection between the seal assembly 28 and the seal carrier surface 34.

The rotor structure 26 includes a seal land 36. This seal land 36 may be a discrete, unitary annular body. Alternatively, the seal land 36 may be configured with another component/portion of the rotor structure 26. The seal land 36 has an outer radial seal land surface 38. This seal land surface 38 may be substantially cylindrical, and extends circumferentially around and faces away from the axial centerline 22. The seal land surface 38 is disposed to face towards and is axially aligned with the seal carrier surface 34. While FIG. 1 illustrates the surfaces 34 and 38 with approximately equal axial lengths along the axial centerline 22, the seal land surface 38 may alternatively be longer or shorter than the seal carrier surface 34 in other embodiments.

The seal assembly 28 includes a primary seal device 40 and one or more secondary seal devices 42; e.g., 1, 2, 3 or more secondary seal devices 42. The seal assembly 28 also includes one or more additional components for positioning, supporting and/or mounting one or more of the seal devices 40 and 42 with the stator structure 24. The seal assembly 28 of FIG. 1, for example, includes a first ring structure 44 configured for positioning, supporting and/or mounting the secondary seal devices 42 relative to the primary seal device 40. This first ring structure 44 may also be configured for axially positioning and/or supporting a second end surface 46 of the primary seal device 40 relative to the stator structure 24. The seal assembly 28 of FIG. 1 also includes a second ring structure 48 (e.g., a scalloped support ring) configured for axially positioning and/or supporting a first end surface 50 of the primary seal device 40 relative to the stator structure 24. However, the second ring structure 48 may be omitted where, for example, the first end surface 50 of the primary seal device 40 may be abutted against another component/portion of the stator structure 24 (e.g., an annular or castellated shoulder) or otherwise axially positioned/ secure with the stator structure 24.

The primary seal device 40 may be configured as an annular non-contact seal device and, more particularly, a hydrostatic non-contact seal device. An example of such a hydrostatic non-contact seal device is a Hydrostatic Adaptive Low Leakage ("HALO™)" seal; however, the primary seal device 40 of the present disclosure is not limited to the foregoing exemplary hydrostatic non-contact seal device.

The primary seal device 40 includes a plurality of seal shoes 54, a plurality of spring elements 56 and a seal base/outer ring 52 that is axially (referring to axial centerline 22) offset from the spring elements 56. The seal shoes 54 are configured as arcuate bodies arranged circumferentially about the axial centerline 22 in an annular array. This annular array of the seal shoes 54 extends circumferentially around the axial centerline 22, thereby forming an inner bore at an inner radial side 62 of the primary seal device 40. The inner bore is sized to receive the seal land 36, where the rotor structure 26 projects axially through (or into) the inner bore formed by the seal shoes 54.

Figure 2:
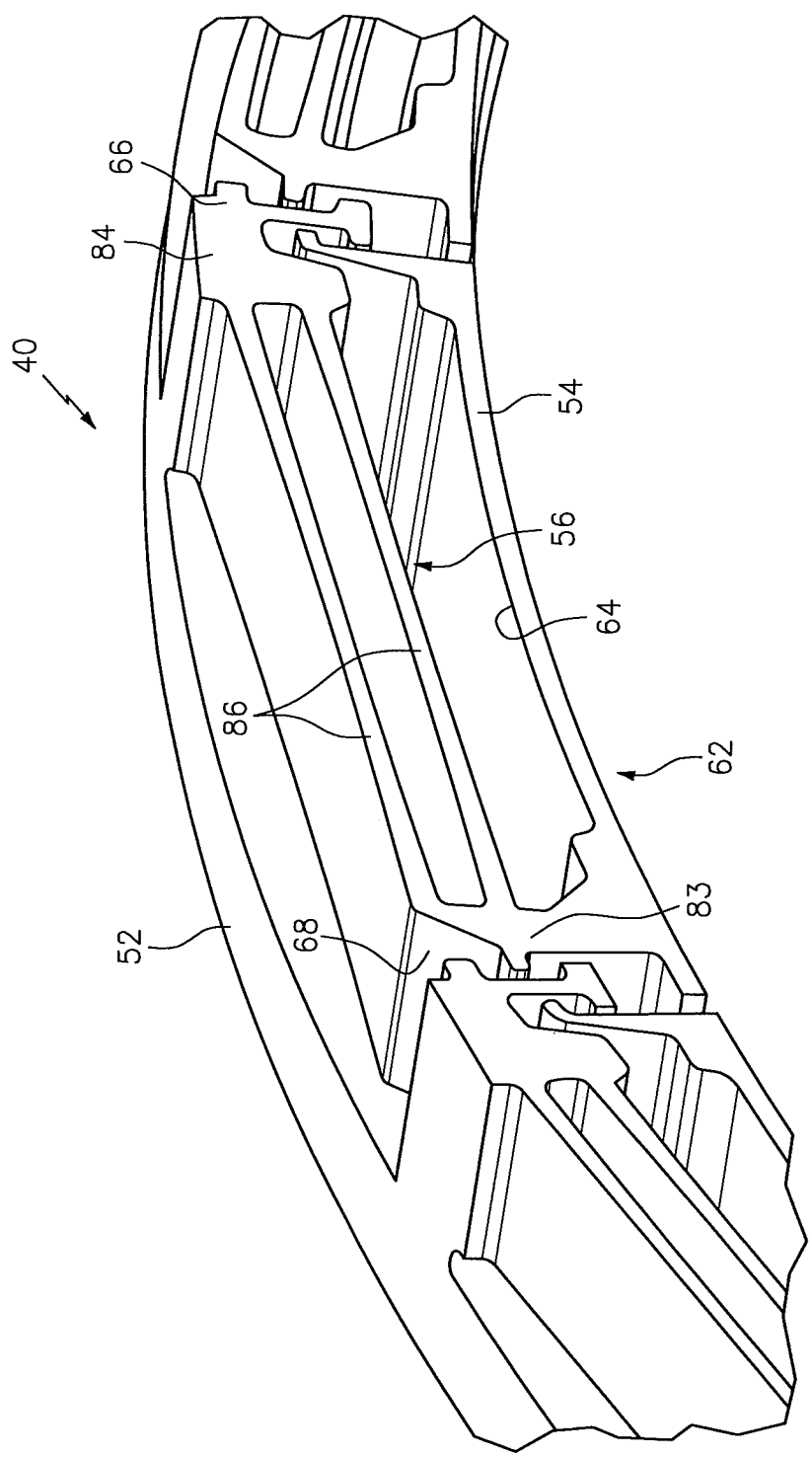
FIG. 2 is a simplified isometric illustration of a portion of a primary seal device with an axially offset outer ring for the assembly of FIG. 1.
Figure 3:
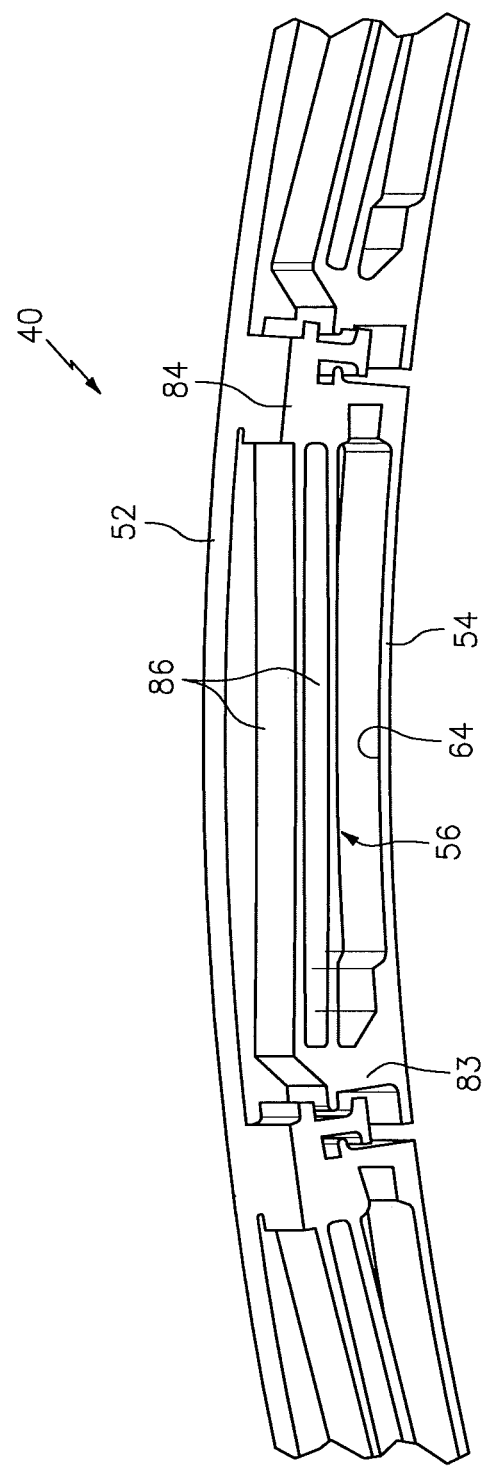
FIG. 3 is an illustration of a hydrostatic non-contact seal with an axially offset outer ring.

Referring to FIGS. 1-3, each of the seal shoes 54 extends radially from the inner radial side 62 of the primary seal device 40 to an outer radial surface 64 of that seal shoe 54. Each of the seal shoes 54 extends circumferentially around the axial centerline 22 between opposing first and second circumferential sides 66 and 68 of that seal shoe 54.

Referring to FIG. 1, each of the seal shoes 54 extends axially along the axial centerline 22 between a first shoe end 70 and a second shoe end 72. The first shoe end 70 may be axially offset from and project axially away from the first end surface 50. The second shoe end 72 may be axially offset from and project axially away from the second end surface 46. The seal shoes 54 of the present disclosure, however, are not limited to such exemplary relationships.

Each of the seal shoes 54 may include an arcuate end surface 74 generally at (e.g., on, adjacent or proximate) the second shoe end 72. In the array (see FIG. 2), these arcuate end surfaces 74 collectively form a generally annular (but circumferentially segmented) end surface 76 configured for sealingly engaging with the secondary seal devices 42; see FIG. 1. The seal shoes 54 of the present disclosure, however, are not limited to the foregoing exemplary configuration.

Each of the seal shoes 54 includes one or more arcuate protrusions 78, which collectively form one or more (e.g., a plurality) of axially spaced generally annular (e.g., circumferentially segmented) ribs. 80 at the inner radial side 62. Distal inner radial ends 82 of one or more of these ribs 80 are configured to be arranged in close proximity with (but not touch) and thereby sealingly engage the seal land surface 38 in a non-contact manner (see FIG. 1), where the rotor structure 26 project axially through (or into) the inner bore formed by the seal shoes 54. The ribs 80 therefore are configured, generally speaking, as non-contact knife edge seal elements.

Referring to FIGS. 1-3, the spring elements 56 are arranged circumferentially about the axial centerline 22 in an annular array. The spring elements 56 are also arranged radially between the seal shoes 54 and the seal base 52. The spring element 56, for example, includes one or more mounts 83 and 84 (e.g., generally radial fingers/projections) and one or more beams 86 (e.g., cantilever-leaf springs). The first mount 83 is connected to a respective one of the seal shoes 54 at (e.g., on, adjacent or proximate) the first circumferential side 68, where the opposing second circumferential side 66 of that seal shoe 54 is free floating. The second mount 84 is connected to an offset seal base/outer ring 52, and is generally circumferentially aligned with or near the second circumferential side 68. With respect to the axial center line 22, the offset seal base 52 is axially offset with respect to the radially most distal beam 86, such that the offset seal base 52 does not radially cover the radially most distal beam 86. The beams are radially stacked and spaced apart with one another. Each of these beams 86 extends laterally (e.g., tangentially or circumferentially) from the first mount 83 to the second mount 84. These spring elements 56 may thereby laterally overlap a major circumferential portion (e.g., ~50-100%) of the seal shoe 54. In contrast, the offset seal base 52 does not laterally overlap at least a primary circumferential portion (e.g., ~65-100%) of the radially most distal beam 86. Subsequently, the radial height of seal assembly 28 may be substantially reduced, to increase radial space and improve packaging with adjacent hardware. FIGS. 1-3 illustrate an embodiment in which the offset seal base/outer ring does not overlap any portion of the radially most distal of the beams 86. The spring elements 56 of the present disclosure, however, are not limited to the foregoing exemplary configuration or values.

During operation of the primary seal device 40, rotation of the rotor structure 26 may develop aerodynamic forces and apply a fluid pressure to the seal shoes 54 causing the each seal shoe 54 to respectively move radially relative to the seal land surface 38. The fluid velocity may increase as a gap between the seal shoe 54 and seal land surface 38 increases, thus reducing pressure in the gap and drawing the seal shoe 54 radially inwardly toward the seal land surface 38. As the gap closes, the velocity may decrease and the pressure may increase within the gap, thus, forcing the seal shoe 54 radially outward from the seal land surface 38. The respective spring element 56 may deflect and move with the seal shoe 54 to create a primary seal of the gap between the seal land surface 38 and ribs 80 within predetermined design tolerances.

Referring again to FIG. 1, while the primary seal device 40 is operable to generally seal the annular gap 30 between the stator structure 24 and the rotor structure 26 as described above, fluid (e.g., gas) may still flow axially through passages 96 defined by radial gaps between the components. 52, 54 and 56. The secondary seal devices 42 therefore are provided to seal off these passages 96 and, thereby, further and more completely seal the annular gap 30.

Each of the secondary seal devices 42 may be configured as a ring seal element such as, but not limited to, a split ring. Alternatively, one or more of the secondary seal devices 42 may be configured as a full hoop body ring, an annular brush seal or any other suitable ring-type seal.

Figure 4:
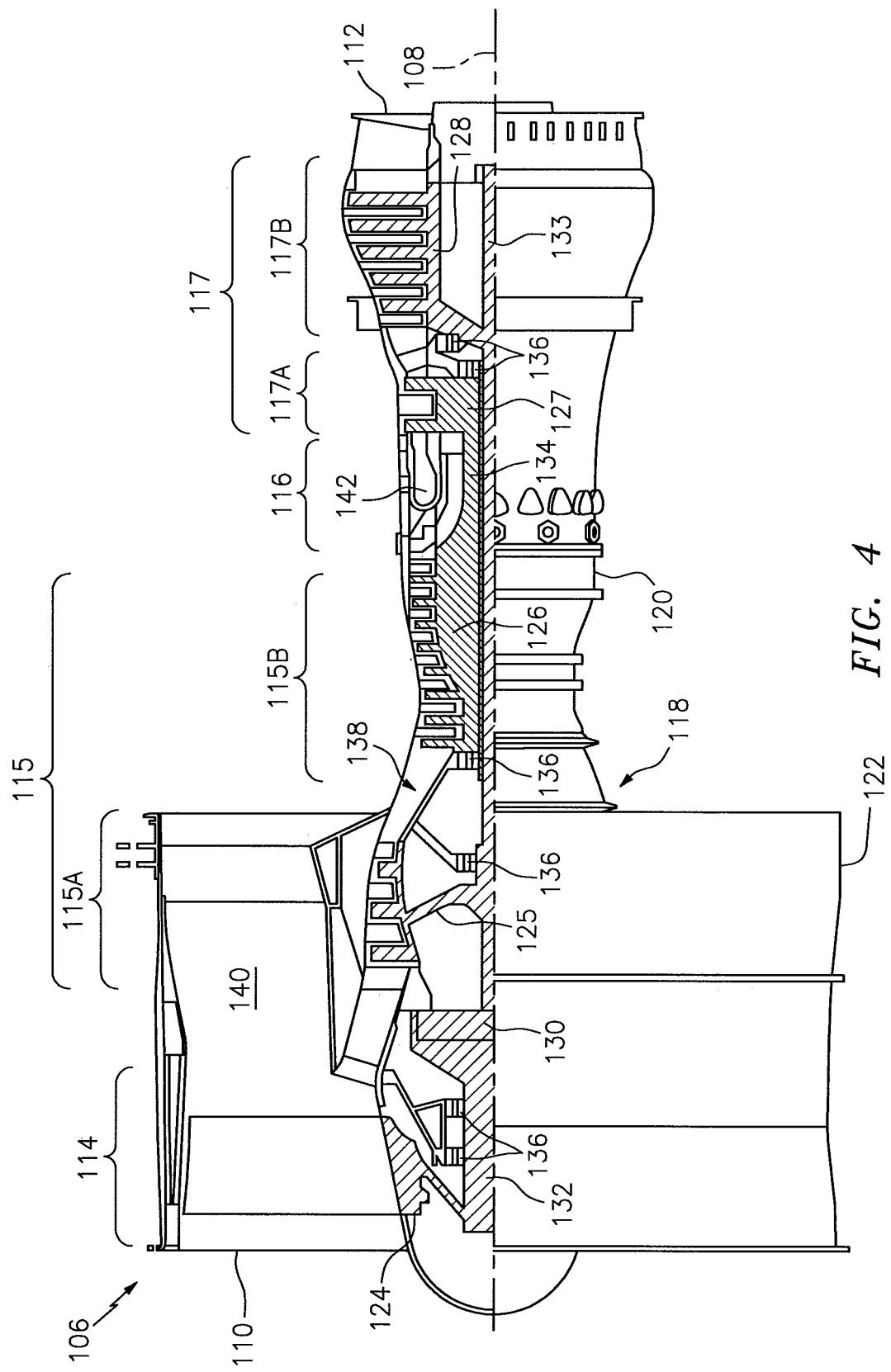
FIG. 4 is a side cutaway illustration of a gas turbine engine.

As described above, the assembly 20 of the present disclosure may be configured with various different types and configurations of rotational equipment. FIG. 4 illustrates one such type and configuration of the rotational equipment—a geared turbofan gas turbine engine 106. Such a turbine engine 106 includes various stator structures (e.g., bearing supports, hubs, cases, etc.) as well as various rotor structures (e.g., rotor disks, shafts, etc.) as described below, where the stator structure 24 and the rotor structure 26 can respectively be configured as anyone of the foregoing structures in the turbine engine 106 of FIG. 4, or other structures not mentioned herein. Referring again to FIG. 1, while the primary seal device 40 is operable to generally seal the annular gap 30 between the stator structure 24 and the rotor structure 26 as described above, fluid (e.g., gas) may still flow axially through passages 96 defined by radial gaps between the components 52, 54 and 56. The secondary seal devices 42 therefore are provided to seal off these passages 96 and, thereby, further and more completely seal the annular gap 30.

The secondary seal devices 42 of FIG. 1 are arranged together in an axial stack. In this stack, each of the secondary seal devices 42 axially engages (e.g., contacts) another adjacent one of the secondary seal devices 42. The stack of the secondary seal devices 42 is arranged with the first ring structure 44, which positions and mounts the secondary seal devices 42 with the stator structure 24 adjacent the primary seal device 40. In this arrangement, the stack of the secondary seal devices 42 is operable to axially engage and form a seal between the end surface 76 of the array of the seal shoes 54 and an annular surface 98 of the first ring structure 44. These surfaces 76 and 98 are axially aligned with one another, which enables the stack of the secondary seal devices 42 to slide radially against, but maintain sealing engagement with, the end surface 76 as the seal shoes 54 move radially relative to the seal land surface 38 as described above.

The first ring structure 44 may include a secondary seal device support ring 100 and a retention ring 102. The support ring 100 is configured with an annular full hoop body, which extends circumferentially around the axially centerline 22. The support ring 100 includes the annular surface 98, and is disposed axially adjacent and engaged with the seal base 52.

The retention ring 102 is configured with an annular full hoop body, which extends circumferentially around the axially centerline 22. The retention ring 102 is disposed axially adjacent and engaged with the support ring 100, thereby capturing the stack of the secondary seal devices 42 within an annular channel formed between the rings 100 and 102. The stack of the secondary seal devices 42 may also or alternatively be attached to one of the rings 100 and 102 by, for example, a press fit connection and/or otherwise.

Referring still to FIG. 4, the turbine engine 106 extends along an axial centerline 108 (e.g., the centerline 22) between an upstream airflow inlet 110 and a downstream airflow exhaust 112. The turbine engine 106 includes a fan section 114, a compressor section 115, a combustor section 116 and a turbine section 117. The compressor section 115 includes a low pressure compressor (LPC) section 115A and a high pressure compressor (HPC) section 115B. The turbine section 117 includes a high pressure turbine (HPT) section 117A and a low pressure turbine (LPT) section 117B.

The engine sections 114-117 are arranged sequentially along the centerline 108 within an engine housing 118, a portion or component of which may include or be connected to the stator structure 24. This housing 118 includes an inner case 120 (e.g., a core case) and an outer case 122 (e.g., a fan case). The inner case 120 may house one or more of the engine sections; e.g., an engine core. The outer case 122 may house at least the fan section 114.

Each of the engine sections 114, 115A, 115B, 117A and 117B includes a respective rotor 124-128. Each of these rotors 124-128 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 124 is connected to a gear train 130, for example, through a fan shaft 132. The gear train 130 and the LPC rotor 125 are connected to and driven by the LPT rotor 128 through a low speed shaft 133. The HPC rotor 126 is connected to and driven by the HPT rotor 127 through a high speed shaft 134. The shafts 132-134 are rotatably supported by a plurality of bearings 136; e.g., rolling element and/or thrust bearings. Each of these bearings 136 is connected to the engine housing 118 by at least one stationary structure such as, for example, an annular support strut.

During operation, air enters the turbine engine 106 through the airflow inlet 110. This air is directed through the fan section 114 and into a core gas path 138 and a bypass gas path 140. The core gas path 138 flows sequentially through the engine sections 115-117. The bypass gas path 140 flows away from the fan section 114 through a bypass duct, which circumscribes and bypasses the engine core. The air within the core gas path 138 may be referred to as "core air". The air within the bypass gas path 140 may be referred to as "bypass air".

The core air is compressed by the compressor rotors 125 and 126 and directed into a combustion chamber 142 of a combustor in the combustor section 116. Fuel is injected into the combustion chamber 142 and mixed with the compressed core air to provide a fuel-air mixture. This fuel air mixture is ignited and combustion products thereof flow through and sequentially cause the turbine rotors 127 and 128 to rotate. The rotation of the turbine rotors 127 and 128 respectively drive rotation of the compressor rotors 126 and 125 and, thus, compression of the air received from a core airflow inlet. The rotation of the turbine rotor 128 also drives rotation of the fan rotor 124, which propels bypass air through and out of the bypass gas path 140. The propulsion of the bypass air may account for a majority of thrust generated by the turbine engine 106, e.g., more than seventy-five percent (75%) of engine thrust. The turbine engine 106 of the present disclosure, however, is not limited to the foregoing exemplary thrust ratio.

The assembly 20 may be included in various aircraft and industrial turbine engines other than the one described above as well as in other types of rotational equipment; e.g., wind turbines, water turbines, rotary engines, etc. The assembly 20, for example, may be included in a geared turbine engine where a gear train connects one or more shafts to one or more rotors in a fan section, a compressor section and/or any other engine section. Alternatively, the assembly 20 may be included in a turbine engine configured without a gear train. The assembly 20 may be included in a geared or non-geared turbine engine configured with a single spool, with two spools (e.g., see FIG. 5), or with more than two spools. The turbine engine may be configured as a turbofan engine, a turbojet engine, a propfan engine, a pusher fan engine or any other type of turbine engine. The present invention therefore is not limited to any particular types or configurations of turbine engines or rotational equipment.

While various embodiments of the present invention have been disclosed, it will be apparent to those of ordinary skill in the art that many more embodiments and implementations are possible within the scope of the invention. For example, the embodiments of the present invention as described herein include several aspects and embodiments that include particular features. Although these features may be described individually, it is within the scope of the embodiments of the present invention that some or all of these features may be combined with any one of the aspects and remain within the scope of the invention. Accordingly, the present invention is not to be restricted except in light of the attached claims and their equivalents.

What is claimed is:

1. A non-contact seal assembly, comprising:
 a seal carrier configured with a seal carrier surface that is substantially cylindrical and extends circumferentially around and faces towards a centerline;
 a plurality of seal shoes arranged about the centerline in an annular array, the seal shoes including a first seal shoe extending axially along the centerline between a first shoe end and a second shoe end;
 a seal base circumscribing axially offset from the annular array of the seal shoes, the seal base connected to the seal carrier surface, the seal base having an annular surface capable of receiving secondary seal devices and a first ring structure, and the seal base having a second end surface opposite a first end surface of a second ring; and
 a plurality of spring elements, each of the spring elements radially distal from and connecting to a respective one of the seal shoes, and each of the plurality of spring elements is axially adjacent to the seal base;
 a first of the spring elements including a first mount, a second mounts, a first beam and a second beam, the first mount connected to the seal base at the second end surface, the second mount connected to the first seal shoe at a first circumferential end, the first beam connected to the first mount and the second mount, the first beam extending laterally relative to the centerline from the first mount to the second mount, the second beam connected to the first mount and the second mount, the second beam extending laterally relative to the centerline from the first mount to the second mount, the second beam axially and laterally overlapping the first beam, and the first of the spring elements having an outer circumferential surface between the first mount and the second mount; and an empty space having a boundary formed by the seal carrier surface, the first end surface, the second end surface and the outer circumferential surface.

2. The non-contact seal assembly of claim 1, further comprising the first ring structure arranged to at least one of position, support or mount the secondary seal devices such that the secondary seal devices are axially separated from the seal base and radially adjacent to the first seal shoe.

3. The non-contact seal assembly of claim 1, further comprising the secondary seal devices are axially and radially adjacent to the seal base and axially adjacent to first the seal shoe.

4. The non-contact seal assembly of claim 1, where the seal assembly comprises nickel alloy.

5. The non-contact assembly of claim 1, where the seal assembly comprises one of cobalt alloy or aluminum.

6. The non-contact seal assembly of claim 1, where the first seal shoe extends circumferentially, at the first shoe end, between the first circumferential end and a second circumferential end for a seal shoe length.

7. The non-contact seal assembly of claim 1, where the seal shoes collectively form a substantially annular end surface at the second shoe end.

8. The non-contact assembly of claim 1, where the first seal shoe extends circumferentially, at the first shoe end, between the first circumferential end and a second circumferential end for a seal shoe length.

9. A non-contact seal assembly, comprising:
a seal carrier configured with a seal carrier surface that is substantially cylindrical and extends circumferentially around and faces towards a centerline;
a plurality of seal shoes arranged about the centerline in an annular array, the seal shoes including a first seal shoe extending axially along the centerline between a first shoe end and a second shoe end;
a seal base circumscribing axially offset along the centerline from the annular array of the seal shoes, the seal base contacting the seal carrier surface, the seal base having an annular surface configured to receive one or more secondary seal devices and a first ring structure, and the seal base having a second end surface opposite a first end surface of a second ring structure; and
a plurality of spring elements, each of the spring elements radially between and connecting a respective one of the seal shoes with the seal base, a first of the spring elements including a plurality of beams connecting the first seal shoe to the seal base, a first of the beams axially and laterally overlapping a second of the beams, the first of the spring elements having an outer circumferential surface between a first mount and a second mount, the first mount connecting the plurality of beams to the seal base at the second end surface, and the second mount connecting the plurality of beams to the first seal shoe at a first circumferential end;

wherein the first of the beams is connected to the first seal shoe independent of the second of the beams, and the second of the beams is connected to the first seal shoe independent of the first of the beams; and wherein a void has a boundary formed by the seal carrier surface, the first end surface, the second end surface and the outer circumferential surface.

10. The non-contact seal assembly of claim 9, further comprising the first ring structure arranged to at least one position, support or mount to the one or more secondary seal devices such that one or more secondary seal devices are axially separated from the axially offset seal base and radially adjacent to the first seal shoe.

11. The non-contact seal assembly of claim 9, further comprising the one more secondary seal devices, wherein each of the one or more secondary seal devices is axially and radially adjacent to the axially offset seal base and axially adjacent to the first seal shoe.

12. The non-contact assembly of claim 11, where the seal assembly comprises nickel alloy.

13. The non-contact assembly of claim 11, where the seal assembly comprises one of cobalt alloy or aluminum.

14. A non-contact seal assembly, comprising:
a seal carrier configured with a seal carrier surface that is substantially cylindrical and extends circumferentially around and faces towards a centerline;
a plurality of seal shoes arranged about the centerline in an annular array, the seal shoes including a first seal shoe extending axially along the centerline between a first shoe end and a second shoe end;
a seal base circumscribing axially offset from the annular array of the seal shoes, the seal base connected to the seal carrier surface, the seal base having an annular surface configured to receive one or more secondary seal devices and a first ring structure, and the seal base having a second end surface opposite a first end surface of a second ring structure; and
a plurality of spring elements, each of the spring elements radially distal from and connecting to a respective one of the seal shoes, and each of the plurality of spring elements is axially adjacent to the seal base;
a first of the spring elements including a first mount, a second mount, a first beam and a second beam, the first mount connected to the seal base at the second end surface, the second mount connected to the first seal shoe at a first circumferential end, the first beam connected to and extending laterally relative to the centerline between the first mount and the second mount, the second beam connected to and extending laterally relative to the centerline between the first mount and the second mount, and the first of the spring elements having an outer circumferential surface between the first mount and the second mount; and
a void having a boundary formed by the seal carrier surface, the first end surface, the second end surface and the outer circumferential surface;
wherein the second beam axially and laterally overlaps the first beam; and
wherein the second beam is connected directly to the first mount and the second mount.

* * * * *